Dec. 30, 1941.  A. W. KOBYLINSKI  2,268,257
GLASS CUTTING TOOL
Filed May 15, 1940

Inventor
ALFRED W. KOBYLINSKI

By Olew E. Bee
Attorney

Patented Dec. 30, 1941

2,268,257

UNITED STATES PATENT OFFICE 2,268,257

GLASS CUTTING TOOL

Alfred W. Kobylinski, Creighton, Pa., assignor to Pittsburgh Plate Glass Company, Allegheny County, Pa., a corporation of Pennsylvania Application May 15, 1940, Serial No. 335,295

2 Claims. (Cl. 49—52)

The present invention relates to cutting instruments and more particularly to a tool adapted to the cutting of glass.

A primary object of the invention is to provide a cutting tool whereby a strong, regular pressure may be exerted upon the cutting element and as the tool is drawn over the glass sheet to effect a score thereof, the cut will be run simultaneously.

Other objects and advantages of the invention will become more apparent from the following detailed description of a preferred embodiment thereof when taken in conjunction with the accompanying drawing, wherein.

Figure 1:
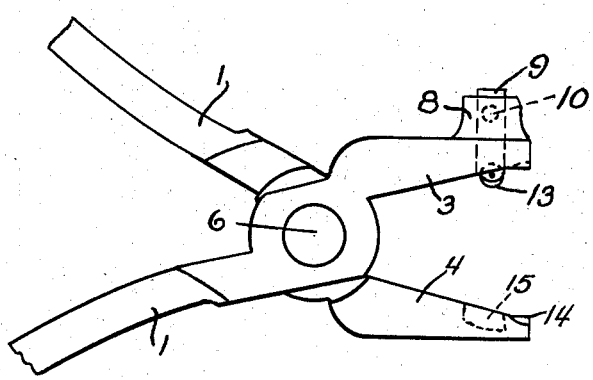
Figure 1 is a fragmentary side elevational view of a cutting tool constructed in accordance with my invention.

Referring to the drawing, a cutting tool comprises a pair of arms 1, having opposed jaw portions 3 and 4, pivotally connected by the spindle 6. The jaw 3 has secured thereto a boss 8 through which extends a rod 9 releasably secured therein by a set screw 10. The inner end of the rod 9 is provided with a yoke 11 in which is mounted, upon a horizontal axle 12, a cutting wheel 13. The lower jaw 4 is provided with an inwardly-projecting finger 14 which bears against the underside of the glass being cut and a socket 15 which receives the cutting wheel 13 when the tool is closed.

Figure 3:
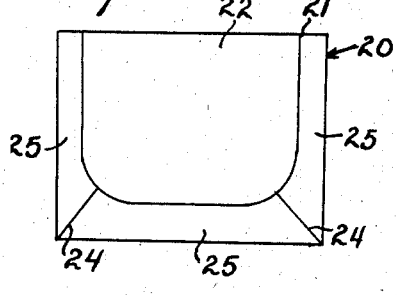
Figure 3 is a plan view of a glass sheet to be cut in the customary manner.
Figure 2:
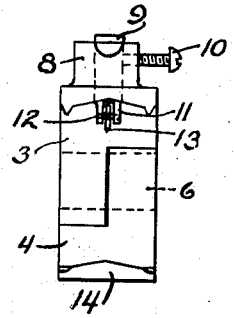
Figure 2 is an end elevational view thereof.

The operation of this cutting tool will be better understood from a description of the methods of cutting glass. Where a special shape is to be cut from a large plate 20 of glass (as shown in Figure 3) a score 21 is made on the glass outlining the section 22 of the desired shape. In order to remove the excess glass, freeing cuts 24 are made and these permit the removal of sections 25 of the plate. With heavier glass plates it is most difficult to run the score 21 and provide clean edges to the section 22. In general glass pliers are necessary.

Figure 4:
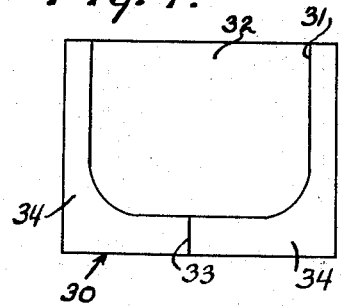
Figure 4 is a plan view of a glass sheet to be cut with my improved tool.

Through the use of my glass cutting tool after a plate 30 of glass (Fig. 4) is scored along a line 31 demarking a section 32 of the desired configuration, the improved tool is employed along the line 33. In drawing the tool from the score 31 to the edge of the plate 30 the score is not only run along the line 33, but simultaneously therewith the score 31 is run, freeing sections 34 of excess glass from the section 32. The outward pull effected by the cutting tool is of such character that the score 31 when run leaves clean edges on the section 32.

It will be obvious that various modifications in the form and arrangement of the several elements of the apparatus are possible without departing from the spirit of the invention or the scope of the appended claims.

What I claim is:

1. A glass cutting tool comprising a pair of pivotally connected arms terminating in opposed jaws, a cutting wheel removably secured to the upper jaw and rotatable about an axis transverse to the upper jaw, and a finger projecting inwardly from the lower jaw lying substantially in the same plane as the cutting wheel.

2. A glass cutting tool comprising a pair of pivotally connected arms terminating in opposed jaws, a boss secured to the outer portion of the upper jaw, a rod releasably secured within the boss and projecting through the upper jaw, a cutting wheel mounted upon the rod and rotatable about an axis transverse to the upper jaw, a socket in the lower jaw adapted to receive the cutting wheel when the jaws are closed, and a finger in advance of the socket projecting inwardly from the lower jaw lying substantially in the same plane as the cutting wheel.

ALFRED W. KOBYLINSKI.